Oct. 30, 1928.
E. G. WATROUS
1,689,540
FLUSHING VALVE
Filed Feb. 13, 1925
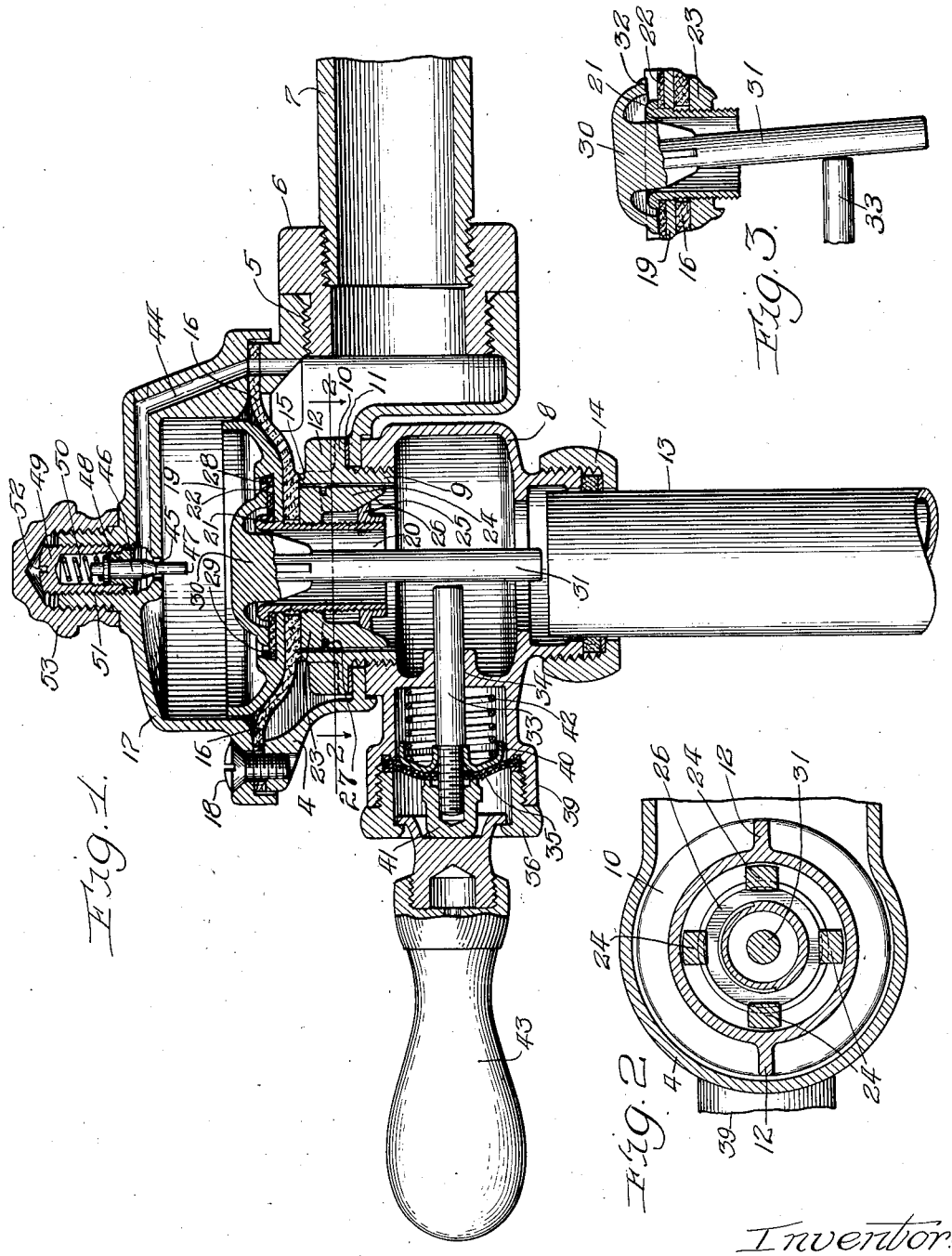
Inventor:
Earl G. Watrous,
By Glenn S. Noble
Atty.

Patented Oct. 30, 1928.

1,689,540

UNITED STATES PATENT OFFICE.

EARL G. WATROUS, OF CHICAGO, ILLINOIS.

FLUSHING VALVE.

Application filed February 13, 1925. Serial No. 8,924.

This invention relates to flushing valves such as are used for flushing toilets where the water supply is sufficient to provide the requisite amount of water direct from the supply pipes. As the ordinary closet requires about twenty gallons of water per minute to properly flush the same, these valves must be so constructed as to allow a large supply of water to pass rapidly through the same, and must then close automatically.

In valves of this character such as heretofore used, the openings from the inlet duct to the controlling chamber have usually been made adjustable, but as such inlets must be comparatively small they are apt to become clogged and therefore put the valve out of operation. Another objectionable feature of such valves is the construction of the outlet valves for the controlling chamber, which are apt to wear grooves in the seats and cause leakage. Furthermore, the valves as heretofore constructed were usually made with the handles in fixed relation to the inlets so that the valves had to be made "right" and "left" or special for different positions.

Among the objects of the present invention are to provide an improved flushing valve which will overcome the objections above set forth, to provide a flushing valve having means for automatically cleaning the inlet opening to the controlling chamber; to provide a device of this character having an improved outlet valve for the controlling chamber; to provide a valve having the supply inlet and the handle portions adjustably mounted for universal movement or adjustment; and to provide such other novel features and improvements in construction as will be described more fully hereinafter.

In the accompanying drawings illustrating this invention,

Figure 1 is a sectional view;

Figure 2 is a cross section taken on the line 2—2 of Figure 1; and

Figure 3 is a detail illustrating the movement of the controlling chamber outlet valve.

In the particular form of my intention as shown in these drawings, the valve body 4 is provided with an attached inlet orifice 5 for receiving the inlet pipe or for receiving a reducing bushing 6 for a smaller inlet pipe 7, the arrangement being such that the valve may be readily attached to different sized inlet pipes. The valve body is adjustably secured to a discharge casing or chamber 8 by means of a threaded sleeve 9 which has a flange 10 which engages with a gasket 11 to make a tight joint. This sleeve also has projections 12 for convenience in turning the same. It will be readily seen that by means of this jointed connection the discharge chamber 8, which carries the handle may be positioned in any desired position with respect to the valve body 4, and permits it to be installed either as a "right hand" or "left hand" valve. The discharge chamber 8 is connected with a discharge pipe 13 which leads to the closet, by means of a packing joint 14, or in any other well known manner.

The sleeve 9 is the outlet from the main valve body and its upper end 15 provides a seat for the main valve diaphragm 16. The outer periphery of the diaphragm is securely fastened between the upper face of the valve body and the controlling chamber casing 17, these parts being securely held together by means of cap screws or bolts 18. It will thus be seen that the diaphragm not only controls the main outlet but also provides a closure between the valve body and the controlling chamber.

A metallic diaphragm cup or disk 19 fits freely within the chamber 17 and is adapted to move up and down in the same. A threaded tube 20 passes through the center of the cup and diaphragm and serves as an outlet from the controlling chamber to the discharge chamber. The tube 20 has a head or flange 21 at the upper end which engages with a resilient annular ring or washer 22. The threaded lower end of the tube is engaged by a lock ring 23 whereby the diaphragm and cup and the ring or washer 22 are tightly clamped together.

The lock ring 23 fits closely within the sleeve 9 and has downwardly projecting guide ribs or fingers 24 so that the ring and attached parts will be guided throughout their movements with respect to the sleeve. I have found that it is somewhat difficult to secure a proper fit between the lock ring and its guide members and the sleeve 9 so that the diaphragm may move freely and yet prevent chattering of the parts. Therefore, in order to provide adjustment of the guide fingers or ribs 24, they are tapered as shown at 25 for engagement by an adjusting ring 26, which is threaded to coact with the lower end of the tube 20. The arrangement is such that by screwing the ring 26 inwardly its tapered outer surface will engage with the tapered surfaces 25 and press the fingers 24 outwardly to adjust them to the sleeve 9. In order to permit the yielding of the fingers for such adjustment, I also provide grooves or cuts 27 at the upper ends thereof.

The annular ring or valve seat 22 fits in a recess 28 in the bottom of the cup 19, and is held by means of a spring ring 29, which fits in the tapered wall of the recess. The valve seat 22 coacts with an outlet valve 30 for the controlling chamber 17, which valve has a downwardly projecting stem 31 for operating the same. The valve 30 has a relatively wide substantially flat annular engaging portion 32, which is adapted to rest on the seat 22, which seat is preferably formed of packing material, rubber or the like. By means of the flat engaging portion it will be seen that even if the outer edge of the valve forms a groove in the seat, as may occur through repeated action, as illustrated in Figure 3, the valve will nevertheless close tightly as the inner periphery of the engaging portion will contact with a portion of the seat which is not subjected to wear by the tipping action. This will avoid the liability to leakage above referred to.

The stem 31 is tipped by means of a plunger 33 which passes through a bearing 34, in the discharge chamber 8 and is engaged by a diaphragm 35, which is held by means of a locking ring 36, which engages with the threaded end of a tubular projection 39 on the side of the discharge chamber. The diaphragm is clamped on the plunger between a cup 40 and a button or head 41. The plunger is held in normal retracted position by a spring 42, which is interposed between the cup 40 and the wall adjacent to the bearing 34. The plunger is actuated by a handle 43 which is mounted in the usual manner for universal movement in the ring 36 and engages with the head 41, the arrangement being such that when the handle is moved in any direction it will force the plunger 42 inwardly against the pin 31.

A small hole or bypass 44 leads from the valve body to an inlet opening 45 in the top of the controlling chamber. The passageway through the inlet opening 45 is controlled by an adjustable pin 46 which is tapered at its lower end and which also has a downward projection 47. This pin is slidably mounted in a bushing 48 which screws into the lower end of a hollow bushing 49, and the pin is held in downward position by means of a spring 50. The hollow bushing 49 is threaded to engage with a threaded tubular lug or projection 51 at the top of the controlling chamber, and has a slot 52 in the upper end thereof whereby it may be turned to adjust the position of the pin 46 with respect to the hole 45 in order to regulate the inlet opening to the controlling chamber. The projection 51 has a cap 53 for covering the same. The projection 47 extends a sufficient distance into the controlling chamber so that it will be engaged by the valve 30 to raise the same each time the flushing valve is operated. By means of this arrangement any small particles or sediment which may pass up through the hole 44 will be dislodged from the regulating pin and consequently the inlet opening will not be apt to become clogged.

The operation of the valve will be readily understood by those familiar with such constructions. When the handle 43 is moved, it will press the plunger 33 against the pin 31, causing the valve 30 to be tipped, as shown in Figure 3. Thereupon, the water in the controlling chamber will be released. Consequently, the pressure against the lower side of the diaphragm 16 will raise the diaphragm until the valve 30 strikes the pin 46 and at the same time, the water will pass from the valve body down through the sleeve 9 and out through the outlet pipe 13. If the handle 43 is held out of normal position, the flushing action will continue until it is again released. When the handle is released the valve 30 will again close and the water passing up through the hole 44 into the controlling chamber will gradually force the diaphragm down until it again closes the main outlet.

It is evident that my improved valve may be made in any desired size and changes may be made in the details of construction to adapt it to different conditions and therefore I do not wish to be limited to the exact construction herein shown and described except as specified in the following claims in which I claim:

1. In a flushing valve, of the character set forth, the combination with a valve body having an intake connection, with a discharge chamber having an outlet connection and supporting the operating handle, and means comprising a sleeve which is threaded for engagement with the discharge chamber and which has a flange for engagement with the valve body for adjustably connecting the discharge chamber to the valve body for rotative adjustment.

2. In a valve of the character set forth, the combination with a discharge sleeve having a valve seat at one end thereof, a diaphragm adapted to coact with the seat, a clamping and guiding ring connected with the diaphragm and fitting in said sleeve, said ring having guiding fingers and means for adjusting the fingers with respect to the sleeve.

3. In a device of the character set forth, the combination with a diaphragm, of a tube projecting therethrough, a clamping and guiding ring engaging with said tube and having projecting guide members which are tapered on their inner faces, and a threaded adjusting ring coacting with the tube and guide members for adjusting said guide members.

4. The combination of a discharge chamber, a spring-pressed plunger mounted transversely to the axis of said chamber, an oscillating handle for actuating said plunger, a valve body adjustably connected to the chamber and having an inlet opening, a discharge member from the valve body to the discharge chamber having a valve seat at the upper end thereof, a diaphragm secured to the valve body and adapted to coact with said valve seat, a controlling chamber arranged above the valve body and closed from the body by said diaphragm, a guiding cup slidably mounted in the controlling chamber, a packing ring in the bottom of said cup, a tube passing through said ring, cup and diaphragm, a clamping and guiding ring coacting with the tube for holding the parts together and guiding the diaphragm, a valve projecting over the tube and engaging with said ring, said valve having a depending stem adapted to be engaged by the plunger, an inlet duct leading from the valve body to the controlling chamber, a threaded projection on the controlling chamber, an adjustable sleeve mounted in said projection, a plug in said sleeve, a pin slidably mounted in said plug, a spring tending to hold said pin in normal position, said pin being tapered and having a projection extending through the inlet to the controlling chamber, the arrangement being such that when the valve is operated the pin will be raised.

EARL G. WATROUS.